Patented Nov. 24, 1953

2,660,604

UNITED STATES PATENT OFFICE 2,660,604

CRYSTALLIZATION OF UREA

Walter Michelitsch, Ludwigshafen (Rhine), Oppau, Germany, assignor to Badische Anilin- & Soda-Fabrik Aktiengesellschaft, Ludwigshafen (Rhine), Germany No Drawing. Application July 12, 1950,
Serial No. 173,481

Claims priority, application Germany
July 20, 1949

8 Claims. (Cl. 260—555)

This invention relates to the manufacture of urea in crystallized form, and the object of the invention consists in obtaining urea from its aqueous solutions in a form which is well to handle and stable in storage.

I have found that the crystal form of urea can be considerably influenced by carrying out the crystallisation of the urea from aqueous solutions in the presence of small amounts of glyoxal-urea condensation products having been added to the said solutions. For this purpose acetylene-diurea (glyoxal-diurein) and the condensation products of glyoxal-urea condensation products with formaldehyde, as for example tetramethylol-acetylene-diurea, are well suitable. The substances obtained by heating glyoxal-urea condensation products, such as acetylene-diurea, for example to 250° C., also exert the same action.

In the presence of acetylene-diurea or its condensation products with formaldehyde, the urea separates from its aqueous solutions in the form of broad prisms the squattiness of which increases with increase of the amount added. In the presence of the products obtained by heating acetylene-diurea, the urea forms crystals also in the form of broad prisms when a small amount is added, but when larger amounts are added the crystals are in the form of tetrahedrons. The amounts which it is necessary to add are very small and in general amount to between 0.05 and 0.3 per cent with reference to the amount of urea dissolved. An addition of more than about 1 per cent is not practicable because the additional substances are difficultly soluble in water or urea solutions.

Traces of the additional substances which adhere to the recovered urea crystals are not deleterious in the use and further working up of the urea. If it is worked up into urea resins by condensation with formaldehyde, these traces enter into the end product in the condensation in the same way as the urea itself.

On a technical scale, the crystallisation usually takes place while stirring; generally speaking this promotes growth in the width of the crystals and suppresses longitudinal growth. From quiescent crystallising plants there may be obtained according to this invention prisms up to 30 millimetres in length and from 6 to 7 millimetres in breadth and having rounded surfaces at both ends. The crystals obtained while stirring are on an average from 3 to 4 millimetres long and from 2 to 3 millimetres in thickness, while the crystals which are obtained from urea solutions without the said additions, but under otherwise identical conditions, have a thickness of only from 0.1 to 0.15 millimetre.

The coarse crystalline urea obtained according to this invention is better to handle in its separation from the mother liquor and in the drying of the crystal material and it is more stable in storage than crystallised urea obtained in the usual way. A further advantage resides in the fact that the walls of the container and the cooling coils are not covered with thick crystal deposits which hinder the transfer of heat as is the case with small crystals.

The following examples will further illustrate the present invention but the invention is not limited to these examples.

Example 1

29 grams of acetylene-diurea are added to 22 kilograms of a 65 per cent aqueous solution of urea at a temperature of about 60° C. The clear colourless solution is cooled slowly while stirring. The first separation of crystals commences at 46° C. The temperature after 5 hours is about 30° C. and after a further 5 hours it is 25° C. The crystals obtained are separated from the liquid and dried. 6.1 kilograms of urea are obtained in the form of broad prisms.

Example 2

30 grams of acetylene-diurea which have previously been heated for 2 hours at 250° C. are added to 22 kilograms of a 65 per cent aqueous urea solution at a temperature of about 60° C. Active charcoal is added to the yellowish solution and the latter then filtered. The now practically colourless clear solution is brought to crystallisation under the same conditions as described in Example 1. 6.2 kilograms of urea are obtained in the form of coarse tetrahedra.

What I claim is:

1. A process for the recovery of urea crystals from aqueous solutions of urea which consists in adding at an elevated temperature to an aqueous urea solution saturated with urea at the said temperature a glyoxal-urea condensation product selected from the group consisting of acetylene-diurea, the product obtained by heating acetylene-diurea for about 2 hours at about 250° C. and tetramethylol acetylene-diurea in an amount between about 0.05 and 0.3 per cent with reference to the amount of urea dissolved, slowly cooling while stirring the solution to normal temperature and separating the urea crystals from the mother liquor.

2. A process for the recovery of urea crystals from aqueous solutions of urea which consists in adding at a temperature of about 60° C. to an about 65 per cent aqueous solution of urea acetylene-diurea in amounts of between about 0.05 and 0.3 per cent with reference to the amount of urea dissolved, slowly cooling while stirring the solution to normal temperature and separating the urea crystals from the mother liquor.

3. A process for the recovery of urea crystals from aqueous solutions of urea which consists in adding at a temperature of about 60° C. to an about 65 per cent aqueous solution of urea the product obtained by heating acetylene-diurea at a temperature of about 250° C. for about two hours, in amounts of between about 0.05 and 0.3 per cent with reference to the amount of urea dissolved, adding active charcoal to the solution, separating off the active charcoal by filtering, cooling while stirring the filtrate to normal temperature and separating the urea crystals from the mother liquor.

4. A process for the recovery of urea crystals from aqueous solutions of urea which consists in crystallizing urea from an aqueous solution thereof in the presence of a fraction of a per cent with reference to the amount of urea dissolved of a compound from the group consisting of acetylene-diurea, the product obtained by heating acetylene-diurea for about 2 hours at about 250° C. and tetramethylol acetylene-diurea, and separating the urea crystals from the mother liquor.

5. A process for the recovery of urea crystals from aqueous solutions of urea which consists in crystallizing urea from an aqueous solution thereof in the presence of a fraction of a per cent with reference to the amount of urea dissolved of acetylene-diurea, and separating the urea crystals from the mother liquor.

6. In a process for the recovery of urea crystals from aqueous solutions of urea, the step which consists in crystallizing urea from an aqueous solution thereof in the presence of a fraction of a per cent with reference to the amount of urea dissolved of acetylene-diurea.

7. In a process for the recovery of urea crystals from aqueous solutions of urea, the step which consists in crystallizing urea from an aqueous solution thereof in the presence of a fraction of a per cent with reference to the amount of urea dissolved of tetramethylol acetylene-diurea.

8. In a process for the recovery of urea crystals from aqueous solutions of urea, the step which consists in crystallizing urea from an aqueous solution thereof in the presence of a fraction of a per cent with reference to the amount of urea dissolved of the product obtained by heating acetylene-diurea for about 2 hours at about 250° C.

WALTER MICHELITSCH.

References Cited in the file of this patent

UNITED STATES PATENTS

| Number | Name | Date |
|---|---|---|
| 2,498,539 | Frejacques | Feb. 21, 1950 |
| 2,574,114 | Lehmann et al. | Nov. 6, 1951 |

FOREIGN PATENTS

| Number | Country | Date |
|---|---|---|
| 712,561 | Germany | Sept. 25, 1941 |
| 827,217 | France | Apr. 21, 1938 |

OTHER REFERENCES

Pauly et al., "Ber. deut. Chem." vol. 63 (1930), 2063 to 2069.

"British Plastics and Moulded Products Trades," Aug. 1938, pp. 115–18.

Ritchie, "Chemistry of Plastics and High Polymers" (1949), pp. 115–122.